United States Patent
Collins et al.

(10) Patent No.: US 9,513,396 B2
(45) Date of Patent: Dec. 6, 2016

(54) FORMATION PROPERTY DETERMINATION APPARATUS, METHODS, AND SYSTEMS

(75) Inventors: Mark V. Collins, Houston, TX (US); Arthur Cheng, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 41 days.

(21) Appl. No.: 13/878,727

(22) PCT Filed: Aug. 28, 2012

(86) PCT No.: PCT/US2012/052679
§ 371 (c)(1),
(2), (4) Date: Apr. 10, 2013

(87) PCT Pub. No.: WO2013/039690
PCT Pub. Date: Mar. 21, 2013

(65) Prior Publication Data
US 2014/0195160 A1    Jul. 10, 2014

Related U.S. Application Data

(60) Provisional application No. 61/533,620, filed on Sep. 12, 2011, provisional application No. 61/533,420, filed on Sep. 12, 2011.

(51) Int. Cl.
*G01V 1/40* (2006.01)
*G01R 13/00* (2006.01)
(Continued)

(52) U.S. Cl.
CPC . *G01V 1/50* (2013.01); *G01V 1/36* (2013.01); *G01V 2210/1299* (2013.01); *G01V 2210/27* (2013.01); *G01V 2210/67* (2013.01)

(58) Field of Classification Search
CPC ............ G01V 1/36; G01V 1/50; G01V 3/28; G01V 2210/67; G01V 2210/27; G01V 2210/1299
USPC ............................................ 702/6, 9, 14, 66
See application file for complete search history.

(56) References Cited

U.S. PATENT DOCUMENTS

| 4,912,979 A | 4/1990 | Sondergeld et al. |
| 5,278,805 A | 1/1994 | Kimball |

(Continued)

FOREIGN PATENT DOCUMENTS

WO    WO-2013039687 A1    3/2013

OTHER PUBLICATIONS

"International Application Serial No. PCT/US2012/052658, Search Report mailed Nov. 14, 2012", 2 pgs.
(Continued)

*Primary Examiner* — An Do
(74) *Attorney, Agent, or Firm* — Schwegman Lundberg & Woessner, P.A.; Benjamin Fite (57) ABSTRACT

In some embodiments, apparatus and systems, as well as methods, may operate to record a plurality of acoustic waveforms comprising cross-dipole waveforms and corresponding to acoustic waves received 5 at azimuthally orthogonal dipole receiver arrays surrounded by a geological formation, the waves being generated by azimuthally orthogonal dipole transmitter arrays. Further activity may include defining an objective function dependent on the cross-dipole waveforms, eigenvalues, an azimuth angle corresponding to an 10 orientation of the transmitter and receiver arrays; minimizing the objective function with respect to said angle and the set of auxiliary parameters; and determining at least one property of the geological formation based on the global minimum. Additional apparatus, systems, and methods are disclosed.

29 Claims, 9 Drawing Sheets

(51) Int. Cl.
*G01V 1/50* (2006.01)
*G01V 1/36* (2006.01)

(56) References Cited

U.S. PATENT DOCUMENTS

| | | | |
|---|---|---|---|
| 5,541,890 | A | 7/1996 | Tang |
| 5,712,829 | A | 1/1998 | Tang |
| 5,740,124 | A | 4/1998 | Chunduru et al. |
| 5,791,899 | A | 8/1998 | Sachdeva et al. |
| 5,808,963 | A | 9/1998 | Esmersoy |
| 6,098,021 | A | 8/2000 | Tang et al. |
| 6,449,560 | B1 | 9/2002 | Kimball |
| 6,718,266 | B1 | 4/2004 | Sinha et al. |
| 6,791,899 | B2 | 9/2004 | Blanch et al. |
| 6,826,485 | B1 | 11/2004 | Bale et al. |
| 6,842,400 | B2 | 1/2005 | Blanch et al. |
| 7,295,926 | B2 | 11/2007 | Jeffryes |
| 7,310,285 | B2 | 12/2007 | Donald et al. |
| 7,474,996 | B2 | 1/2009 | Horne et al. |
| 7,623,412 | B2 | 11/2009 | Pabon et al. |
| 8,102,732 | B2 * | 1/2012 | Pabon ............... G01V 1/50 367/25 |
| 8,326,539 | B2 * | 12/2012 | Morrison ............... G01V 3/28 702/11 |
| 9,069,097 | B2 * | 6/2015 | Zhang ............... G01V 3/28 |
| 9,348,052 | B2 | 5/2016 | Collins et al. |
| 2002/0186895 | A1 | 12/2002 | Gloersen |
| 2004/0158997 | A1 | 8/2004 | Tang |
| 2007/0140055 | A1 | 6/2007 | Tello et al. |
| 2007/0156359 | A1 | 7/2007 | Varsamis et al. |
| 2007/0274155 | A1 | 11/2007 | Ikelle |
| 2008/0319675 | A1 | 12/2008 | Sayers |
| 2009/0185446 | A1 | 7/2009 | Zheng et al. |
| 2010/0020642 | A1 | 1/2010 | Sinha |
| 2010/0034052 | A1 | 2/2010 | Pabon et al. |
| 2010/0309748 | A1 | 12/2010 | Tang et al. |
| 2011/0019501 | A1 | 1/2011 | Market |
| 2014/0222346 | A1 | 8/2014 | Collins et al. |
| 2015/0112596 | A1 | 4/2015 | Collins |

OTHER PUBLICATIONS

"International Application Serial No. PCT/US2012/052658, Written Opinion mailed Nov. 14, 2012", 6 pgs.
"International Application Serial No. PCT/US2012/052679, Search Report mailed Nov. 6, 2012", 2 pgs.
"International Application Serial No. PCT/US2012/052679, Written Opinion mailed Nov. 6, 2012", 3 pgs.
"Australian Application Serial No. 2012309003, Response filed Feb. 5, 2015 to Examination Report No. 1 mailed Oct. 20, 2014", 19 pgs.
"Canadian Application Serial No. 2,846,626, Office Action mailed May 1, 2015", 3 pgs.
"European Application Serial No. 12831892.0, Response filed Jun. 24, 2015 to Supplementary European Search Report mailed Feb. 12, 2015", 17 pgs.
"European Application Serial No. 12831892.0, Supplementary European Search Report mailed Feb. 12, 2015", 7 pgs.
"European Application Serial No. 12832411.8, Office Action mailed Mar. 3, 2015", 1 pg.
"European Application Serial No. 12832411.8, Response filed Mar. 23, 2015 to Extended European Search Report mailed Feb. 12, 2015 and Office Action mailed Mar. 3, 2015", 14 pgs.
"European Application Serial No. 12832411.8, Supplementary European Search Report mailed Feb. 12, 2015", 7 pgs.
"International Application Serial No. PCT/US2012/052658, International Preliminary Report on Patentability mailed Apr. 15, 2015", 4 pgs.
"International Application Serial No. PCT/US2012/052658, Response filed Dec. 11, 2012 to Written Opinion mailed Nov. 14, 2012", 4 pgs.
"Mexican Application No. MX/a/2014/002937, Response filed Mar. 13, 2015 to Office Action dated Jan. 15, 2015", (w. English Translation of Claims), 20 pgs.
"Mexican Application Serial No. MX/a/2014/002937, Office Action mailed Jan. 15, 2015", (w/ English Summary), 3 pgs.
"Mexican Application Serial No. MX/a/2014/002945, Office Action mailed Jan. 15, 2015", (w/ English Summary), 3 pgs.
"Mexican Application Serial No. MX/a/2014/002945, Response filed Mar. 13, 2015 to Office Action mailed Jan. 15, 2015", (w/ English Translation of Claims), 15 pgs.
"Australian Application Serial No. 2012309003, Examination Report No. 1 mailed Oct. 20, 2014", 3 pgs.
"Australian Application Serial No. 2012309006, Notice of Acceptance mailed Feb. 24, 2014", 8 pgs.
"Canadian Application Serial No. 2,848,465, Office Action mailed May 15, 2014", 2 pgs.
"Canadian Application Serial No. 2,848,465, Response filed Nov. 11, 2014 to Office Action mailed May 15, 2014", 2 pgs.
"European Application Serial No. 12831892.0, Response filed Aug. 27, 2014 to Office Action mailed Feb. 28, 2014", 13 pgs.
"European Application Serial No. 12832411.8, Office Action mailed Apr. 22, 2014", 3 pgs.
"European Application Serial No. 12832411.8, Response filed Oct. 14, 2014 to Official Action mailed Apr. 22, 2014", 12 pgs.
"International Application Serial No. PCT/US2012/052658, Written Opinion mailed Nov. 3, 2014", 4 pgs.
U.S. Appl. No. 14/586,623, filed Dec. 30, 2014, Estimation of Fast Shear Azimuth, Methods and Appartus.
"European Application Serial No. 12831892.0, Office Action mailed Feb. 28, 2014", 3 pgs.
"International Application Serial No. PCT/US2012/052679, International Preliminary Report on Patentability mailed Mar. 20, 2014", 5 pgs.
Tang, X.-M., et al., *In: vol. 24—Quantitative Borehole Acoustic Methods, Handbook of Geophysical Exploration: Seismic Exploration.* Elsevier Ltd., (2004), 159-167.
"U.S. Appl. No. 14/343,006, Notice of Allowance mailed Aug. 27, 2015", 9 pgs.
"U.S. Appl. No. 14/343,006, Notice of Allowance mailed Oct. 7, 2015", 8 pgs.
European Application Serial No. 12831892.0, Office Action mailed Nov. 26, 2015, 5 pgs.
European Application Serial No. 12831892.0, Reply filed Apr. 1, 2016 to Office Action mailed Nov. 26, 2015, 13 pgs.
Canadian Application Serial No. 2,846,626, Office Action mailed Jul. 25, 2016, 4 pgs.
European Application Serial No. 12832411.8, Response filed Aug. 31, 2016 to Office Action mailed May 3, 2016, 23 pgs.

* cited by examiner

FORMATION PROPERTY DETERMINATION APPARATUS, METHODS, AND SYSTEMS

RELATED APPLICATION

This application is a U.S. National Stage Filing under 35 U.S.C. 371 from International Application No. PCT/US2012/052679, filed on 28 Aug. 2012, and published as WO 2013/039690 A1 on 21 Mar. 2013, which application claims priority benefit to U.S. Provisional Patent Application Ser. No. 61/533,620, filed Sep. 12, 2011, and to U.S. Provisional Patent Application Ser. No. 61/533,420, filed Sep. 12, 2011, which applications and publication are incorporated herein by reference in their entirety.

BACKGROUND

Conventional algorithms use only numerical searching for anisotropy processing of cross-dipole acoustic waveforms, to minimize an objective function whose parameters are the azimuth angle of the X-dipole transmitter relative to the fast principal flexural wave axis, and a set of auxiliary parameters. The auxiliary parameters are used to characterize the received waveforms as functions of slowness and borehole radius, among others. Sometimes the processing is used to determine the location and amount of stress-induced anisotropy in a geological formation.

DETAILED DESCRIPTION

Algorithms for anisotropy processing of cross-dipole acoustic waveforms can operate to minimize an objective function whose parameters are the azimuth angle, $\theta$, of the X-dipole transmitter relative to the fast principal flexural wave axis and a set of auxiliary parameters. The auxiliary parameters are used to characterize the received waveforms as functions of slowness, borehole radius, etc. Minimizing the objective function with respect to all the parameters can provide a desired anisotropy angle. The dependence of the objective function on angle is based on the assumption that the cross-dipole acoustic waveforms obey the Alford rotation equations, i.e. the 2×2 cross-dipole waveform matrix, $X_{kl}$, can be diagonalized by a similarity transformation, $T^T(\theta)XT(\theta)$, using a real 2×2 orthonormal matrix, $T(\theta)$. The objective function measures how well this is accomplished, for example, by minimizing the off-diagonal elements of the similarity transformation with respect to angle.

Embodiments of the invention use the fact that the waveform matrix can be exactly diagonalized by a similarity transformation using a unitary matrix, U. The eigenvalues of the diagonalized matrix are direct estimates of the fast and slow principal waves. Objective functions can then be formed; these functions are dependent upon the eigenvalues, as well as $T(\theta)$ and $X_{kl}$.

When processing cross-dipole acoustic waveform data for anisotropy using the Alford rotation relationship between in-line and cross-line data, the objective function can be minimized with respect to angle and the auxiliary parameters using a numerical search method or brute force. However, using the embodiments described herein it is also possible, using the eigenvalues, to solve for the angles as a function of frequency analytically—without recourse to numerical search methods, which are not guaranteed to find the global minimum, and can be computationally expensive. For example, a 90° jump in angle as a function of frequency can be used as an indicator of stress induced anisotropy.

In the detailed description that follows, it is noted that some of the apparatus and systems discussed herein are well known to those of ordinary skill in the art, and thus, the details of their operation are not disclosed in detail, in the interest of economy and clarity. Those that wish to learn more about these apparatus and systems are encouraged to refer to U.S. Pat. Nos. 4,912,979; 5,712,829; 5,808,963; 6,718,266; 6,791,899; 7,310,285; and 7,623,412; and U.S. Patent Publication Nos. 2009/0185446; each of which are incorporated by reference herein in their entirety. Any and all portions of the apparatus, systems, and methods described in each of these documents may be used to realize the various embodiments described herein.

Data Acquisition and Processing

Figure 1:
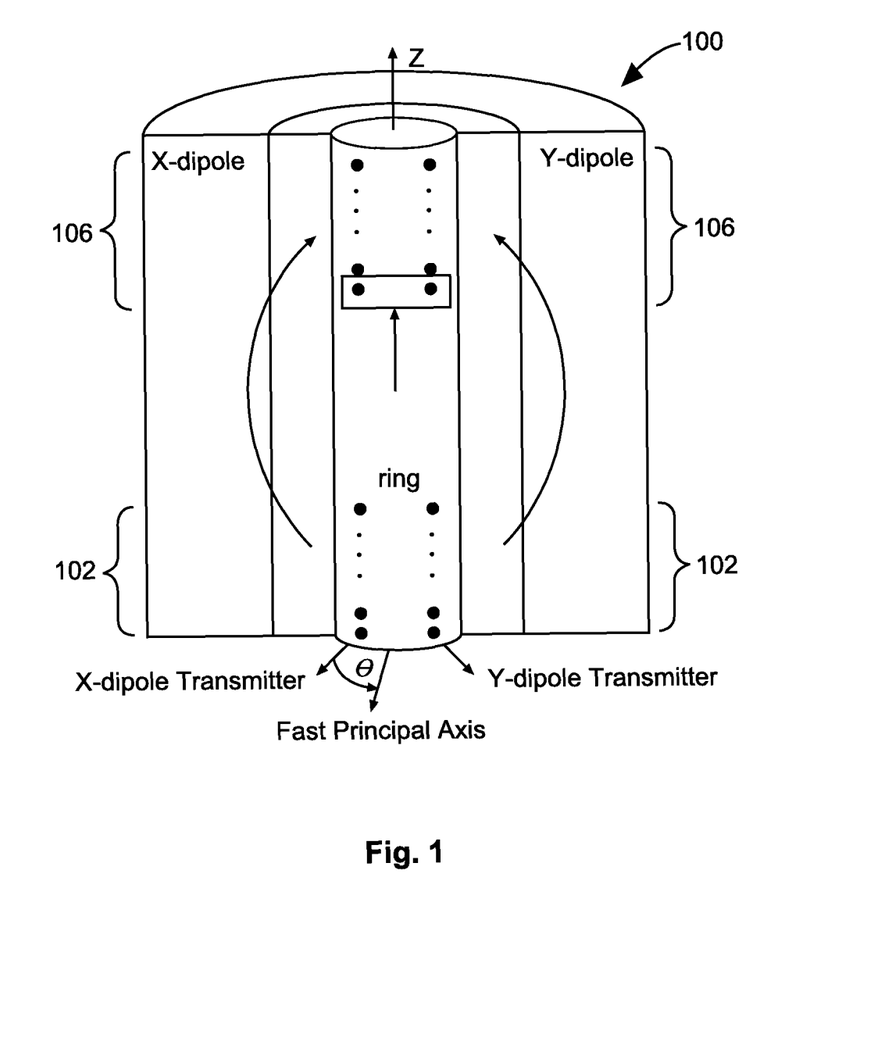
FIG. 1 is an acoustic tool operating according the various embodiments of the invention.

Error! Reference source not found. shows a cross-dipole acoustic tool 100 in a borehole aligned along the z-axis that can be used in conjunction with the method described herein. The tool 100 includes two azimuthally orthogonal dipole-transmitter arrays 102 and two azimuthally orthogonal dipole-receiver arrays 106. Each array has at least one element aligned along the tool axis. Specified in the traditional way, the recorded acoustic waveforms are denoted by in-line components, (XX, YY), and cross-line components, (XY, YX). The first letter refers to the transmitter, and the second letter to the receiver. Thus, for example, the XY recorded waveform is formed by firing the X-directed dipole transmitter and receiving at the Y-directed dipole receiver. The X and Y arrays are aligned along the z-axis such that the m'th element of array X is at the same z-position as the m'th element of array Y and is denoted as ring m. The fast principal wave axis of the formation is directed at angle $\theta$ relative to the x-axis. The Alford rotation equation assumes the waveforms transform as a second order tensor. The relationship can be expressed as shown in equation (1) as follows:

$$T^T X^j T = D^j, \qquad (1)$$

where $$T(\theta) = \begin{bmatrix} \cos\theta & -\sin\theta \\ \sin\theta & \cos\theta \end{bmatrix} \equiv \begin{bmatrix} c_\theta & -s_\theta \\ s_\theta & c_\theta \end{bmatrix}, X^j = \begin{bmatrix} XX_j & XY_j \\ YX_j & YY_j \end{bmatrix}, \text{ and}$$

$$D^j = \begin{bmatrix} FP_j & 0 \\ 0 & SP_j \end{bmatrix}.$$

The real orthonormal matrix, $T(\theta)$, describes the Alford rotation, $XX_j, YY_j, XY_j,$ and $YX_j$ are the in-line and cross-line waveforms from transmitter ring m to receiver ring n, and j represents a data point j={m,n,t or ω}. $FP_j$ and $SP_j$ are the fast and slow principal waves. The fast principal axis is at angle θ relative to the x-axis. Written explicitly, the elements of equation (1) are:

$$(1,1) \Rightarrow c_\theta^2 XX_j + s_\theta^2 YY_j + s_\theta c_\theta (XY_j + YX_j) = FP_j,$$

$$(2,2) \Rightarrow c_\theta^2 YY_j + s_\theta^2 XX_j - s_\theta c_\theta (XY_j + YX_j) = SP_j,$$

$$(1,2) \Rightarrow c_\theta^2 XY_j - s_\theta^2 YX_j - s_\theta c_\theta (XX_j - YY_j) = 0,$$

$$(2,1) \Rightarrow c_\theta^2 YX_j - s_\theta^2 XY_j - s_\theta c_\theta (XX_j - YY_j) = 0. \quad (2)$$

Note these equations are approximate; in general there does not exist a matrix, T(θ), that exactly diagonalizes the cross-dipole data. However, in a similar vein, one can always find a unitary matrix, U, that exactly diagonalizes the cross-dipole data. The corresponding eigenvalues are direct estimates of the fast and slow principal flexural waves, $$U^T X^j U = D^j, \quad (3)$$

where $$D^j = \begin{bmatrix} D_{11}^j & 0 \\ 0 & D_{22}^j \end{bmatrix} \approx \begin{bmatrix} FP_j & 0 \\ 0 & SP_j \end{bmatrix}. \quad (4)$$

Processing Methods

Figure 2:
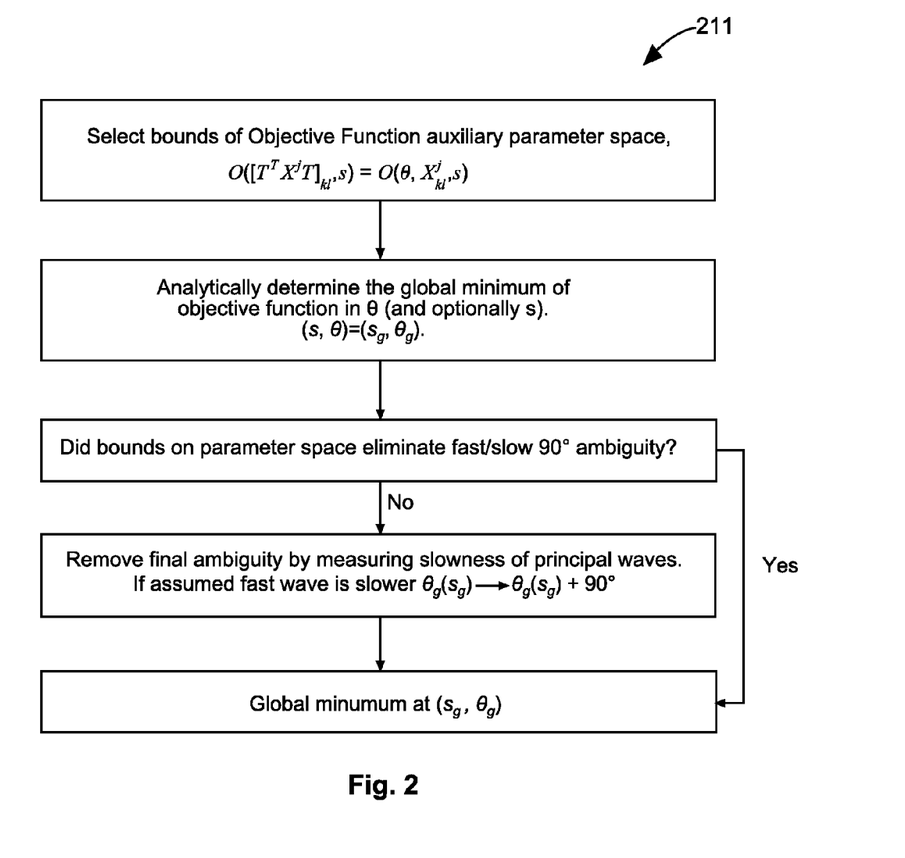
FIG. 2 is a flow chart illustrating anisotropy processing according to various embodiments of the invention.

FIG. 2 is a flow chart illustrating anisotropy processing according to various embodiments of the invention. The anisotropy algorithm 211 can be used to solve for the angle θ by defining an objective function, $O([T^T X^j T]_{kl}, s)$, and minimizing the objective function with respect to (θ, s), where s is an auxiliary parameter space that defines the stacking of the points, j, used in the objective function and/or models the waveforms, $X^j$. Generally, s includes at least a slowness parameter, but may include other parameters such as borehole radius and formation density. The minimization is done using analytical methods, as described in more detail below. Often there are two minima in angle separated by 90°, corresponding to the fast and slow principal axis, which are to be resolved.

(a) A More Detailed Algorithm

Figure 3:
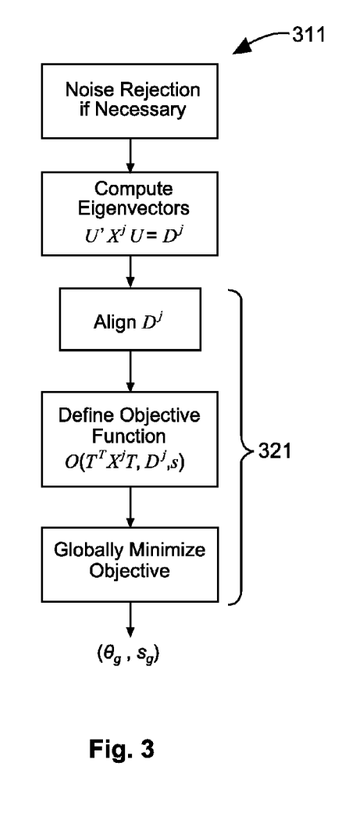
FIG. 3 is a more detailed flow chart illustrating analytic anisotropy processing according to various embodiments of the invention.

FIG. 3 is a more detailed flow chart illustrating analytic anisotropy processing according to various embodiments of the invention. Instead of starting with an objective function formulated from the elements of equation (2), the more detailed algorithm in FIG. 3 uses an objective function formulated from the elements of equation (2) and the eigenvalues from the unitary transformation of equation (3). The algorithm 311 thus starts with implementing an optional noise rejection algorithm, after which the eigenvalues and unitary matrices are computed for each of the points in the data space j={m,n,t or ω}. Noise rejection processing of acquired acoustic waveform data can be accomplished in many different ways, well-known to those of ordinary skill in the art.

The waveforms can be represented in either the frequency or time domains. Note that the unitary transformation is not unique. The columns of U and the corresponding eigenvalues can be swapped so that the (1,1) element of D corresponds to the slow principal wave instead of the fast principal wave. Thus, the eigenvalues from different data points should be aligned relative to one another before they can be used in the objective function. After alignment, the objective function is globally minimized with respect to the angle and auxiliary parameters to determine the angle of the fast anisotropy axis and slowness of the principal waves.

Figure 4:
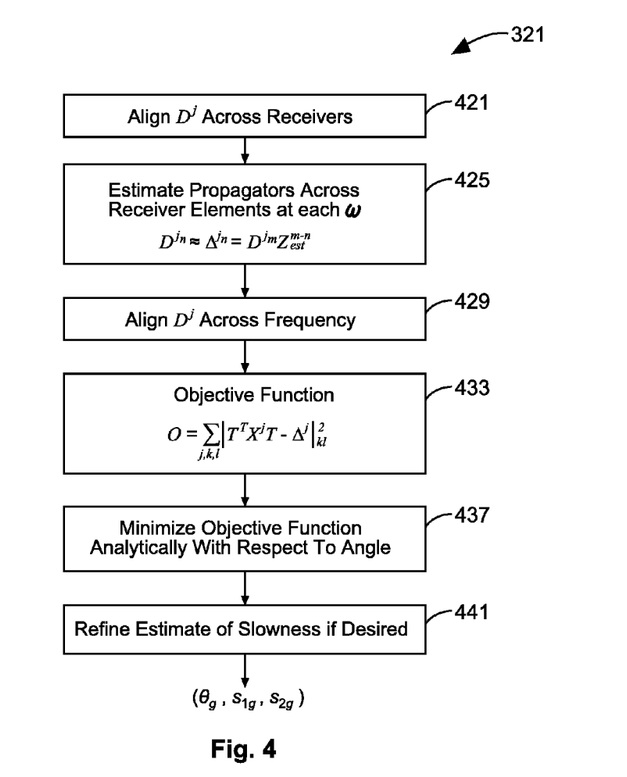
FIG. 4 is a more detailed flow chart illustrating eigenvalue alignment according to various embodiments of the invention.

A more detailed embodiment of blocks 321 in FIG. 3 is shown in FIG. 4, to illustrate eigenvalue alignment according to various embodiments of the invention.

(b) Alignment of Eigenvalues Across Receivers (Block 421)

Note there is a 180° symmetry in equation (2), but replacing θ+θ90° exchanges the eigenvalues and eigenvectors. Since U is almost real and orthonormal, we can align the eigenvalues across receivers as shown below, assuming one transmitter ring and N receiver rings.

The following definition may be employed:

$$u = U_{11}(j_n) + i U_{21}(j_n), \quad (5)$$

where n is the receiver ring index, and a waveform data point is specified by $j_n = \{n, t \text{ or } \omega\}$. In addition, the following definition may also be employed:

$$\theta_n = \text{angle}(u^*_1 u_n), n = 2, \ldots, N. \quad (6)$$

The eigenvalues can be aligned relative to one another across receiver ring by exchanging the eigenvalues of receiver ring n>1 if $$(45° < \theta_n < 135°) | (-135° < \theta_n < -45°). \quad (7)$$

(c) Estimate of Eigenvalue Propagators (Block 425)

After aligning eigenvalues with respect to receiver rings, it is possible to estimate propagators from receiver ring to receiver ring at a given frequency. Assuming the acoustic tool is substantially centered and only the fast and slow principal flexural waves are present, one can represent the eigenvalues as:

$$D_{kk}^{j_n \sim A_k}(\omega) z_k^{-n}(\omega), z_k = e^{i\omega_k d}, \quad (8)$$

As of yet it has not been determined which slowness value, $s_1$ or $s_2$, corresponds to the fast principal wave. According to equation (8), a frequency semblance algorithm can be used to determine the propagator, $Z_{est}$.

One embodiment makes use of the equation (9), as follows:

$$z_k = \frac{\sum_{n=1}^{N-1} (D_{kk}^{j_{n+1}})^* D_{kk}^{j_n}}{\sum_{n=1}^{N-1} (D_{kk}^{j_{n+1}})^* D_{kk}^{j_{n+1}}}, \quad (9)$$

where $$Z_{est}(\omega) = \begin{bmatrix} z_1(\omega) & \\ & z_2(\omega) \end{bmatrix}. \quad (10)$$

Note that using the eigenvalues directly makes it unnecessary to do a numerical search in slowness or angle to minimize the objective function if the minimization in the angle is done analytically. Also note that the propagator measures the slowness across the receiver array. The average slowness from transmitter to first receiver is absorbed in the amplitudes, $A_k(\omega)$. Thus this method intrinsically provides depth resolution equal to the receiver array length.

(d) Alignment of Eigenvalues Across Frequency (Block 429)

After computing the propagator, alignment across frequency can be accomplished to determine whether the first eigenvalue corresponds to the fast principal wave, or the slow principal wave. Assume the objective function is defined over a bandwidth Δω starting at frequency $\omega_{ST}$. Typically the bandwidth will be narrow, because it is useful to detect in-situ stress by solving for the angle as a function of $\omega_{ST}$ by computing the relative phase of the propagators as follows:

$$\Omega(\omega)=\text{angle}(z_1(\omega)^* z_2(\omega)), \omega \le \omega \le \omega_{ST}+\Delta\omega.$$

The eigenvalues are aligned across frequency by comparing the phase. If $\text{sign}(\Omega(\omega)) \ne \text{sign}(\Omega(\omega_{ST}))$, the diagonal elements of D and $Z_{est}$ at $\omega$ are exchanged. If sign $(\Omega(\omega_{ST}))>0$, then the first eigenvalue corresponds to the fast principal wave; otherwise it corresponds to the slow principal wave. By tracking $\text{sign}(\Omega(\omega_{ST}))$ as a function of $\omega_{ST}$ the eigenvalues can be aligned across the frequency spectrum as well. Then a 90° jump in angle can be used to indicate stress induced anisotropy.

(e) The Objective Function (Block 433)

Having aligned the waveforms, the objective function can be defined. The objective function can be chosen to simplify the analytic estimation of angle. In this case, the objective function is defined as $$O(\theta) \equiv \sum_{\substack{j_n=(\omega,n) \\ j_m=(\omega,n) \\ k,l=1,2}}^{B(\omega_{ST},\Delta\omega)} |T^T X^{j_n} T - D^{jm} Z_{est}^{m-n}|_{kl}^2. \quad (12)$$

When minimized over angle, this objective function will operate to determine the best real orthonormal $T(\theta)$ that fits the waveforms to the eigenvalues. As the process continues, it is mathematically expedient to change the notation as shown in equation (13):

$$O(\theta) \equiv \sum_{\substack{j=\{j_n,j_m\} \\ k,l=1,2}}^{B(\omega_{ST},\Delta\omega)} |T^T X^j T - \Delta^j|_{kl}^2, \quad (13)$$

where $$\Delta^j \equiv D^{jm} Z_{est}^{m-n}, \quad (14)$$
$$X^j = X^{jn} \forall j_m.$$

(f) Analytic Minimization of the Angle (Block 437)

Due to the choice of objective function, minimization with respect to angle is greatly simplified. The result is shown in equation (14):

$$\tan(2\theta) = \frac{\text{Re}[\vec{a}^* \cdot \vec{d}]}{\text{Re}[\vec{b}^* \cdot \vec{d}]}, \quad (14)$$

where the vectors are defined as:

$$a^j = X_{12}^j + X_{21}^j,$$
$$b^j = X_{22}^j + X_{11}^j,$$
$$d^j = \Delta_{22}^j - \Delta_{11}^j. \quad (15)$$

Solving equation (14) gives two possible global minimization angles separated by 90°. They are substituted into equation (13) to determine the true global minimum, $\theta_g(\omega_{ST})$. Thus, ambiguities may be removed a priori by limiting the range of the auxiliary parameter space.

Figure 9:
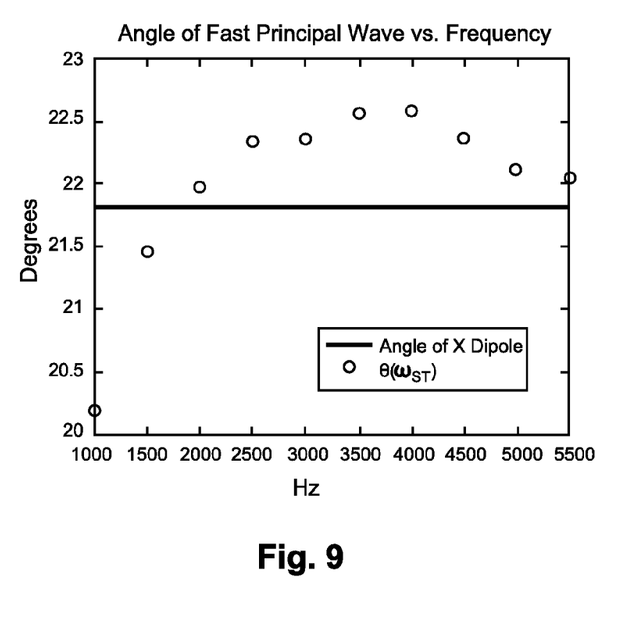
FIG. 9 is a graph of the angle of the fast principal wave vs. frequency according to various embodiments of the invention.

FIG. 9 shows the angle of the fast principal wave as a function frequency for a synthetic crossed dipole. Here, the X-dipole is oriented at 21.8° relative to the fast principal wave axis. The data in this case was generated using a spatially constant elasticity matrix, so there is no 90° jump.

(g) Refinement of Slowness Estimates (Block 441)

Returning now to FIG. 4, at block 441, it is noted that slowness estimates can be refined by rotating the waveforms using $\theta_g$ (w) into the fast and slow principal waves using equation (2). A frequency semblance algorithm can be used to detect slowness.

Figure 10:
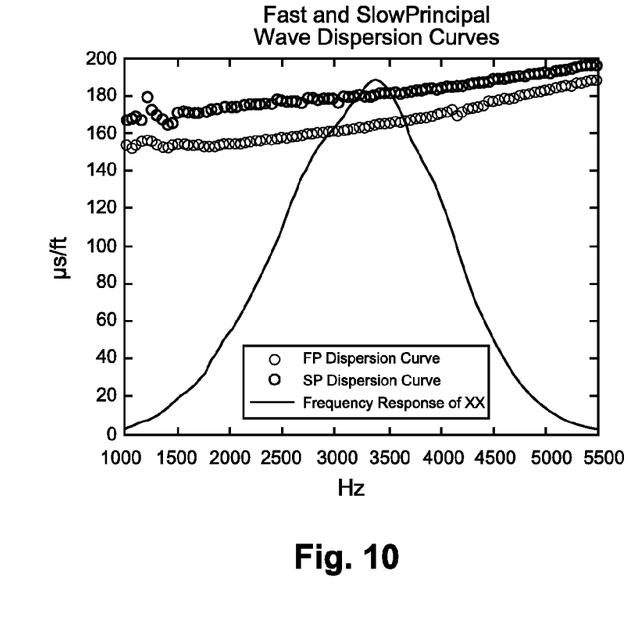
FIG. 10 is a graph of the fast and slow principal wave dispersion curves according to various embodiments of the invention.

FIG. 10 shows the frequency dispersion curves for the same synthetic waveforms computed using a matrix pencil algorithm: a computationally efficient method that can be used for estimating signal parameters, which is well-known to those of ordinary skill in the art. In this case, it is seen that the fast wave has a slowness of about 155 µs/ft., and the slow wave has a slowness of about 175 µs/ft.

Additional Features

Previous solutions to the problem of estimating anisotropy minimize the objective function using a numerical search. The proposed approach uses the eigenvalues derived from a unitary similarity transformation as estimates of the fast and slow principal waves. These estimates can then be used in the objective function as well as the components of equation (2). This makes the objective function more robust, so that it is possible to minimize the objective function analytically.

The ability to detect stress induced anisotropy is a useful aspect of formation evaluation and can be a governing factor in the optimization of the development of a reservoir. Conventional software measures anisotropy using a numerical search or brute force minimization of an objective function in the time or frequency domain. When operating in the time domain the objective function uses the early arrivals of the cross-dipole waveforms over a narrow time interval. After solving for the angle of anisotropy, the fast and slow principal waves are generated using equation (2). Individual depths are analyzed for the presence of stress induced anisotropy by plotting an overlay of the fast and slow dispersion curves. Visual inspection of the dispersion curves for a cross-over in slowness is indicative of stress induced anisotropy. If there is no cross-over, then the anisotropy may be due to some other cause, such as intrinsic anisotropy.

Visual inspection by the operator of two very similar and sometimes noisy dispersion curves can be impractical for processing an entire well bore log, so that individual depths are only spot-checked.

Frequency domain embodiments using the aligned eigenvalues have the advantage of directly measuring the angle as a function of frequency. Stress induced anisotropy is detected by a jump of approximately 90° in the angle as a function of frequency, providing a more reliable indicator that is more amenable to automation than conventional methods. Some embodiments shown herein also provide a depth resolution approximately equal to the receiver array length.

Figure 11:
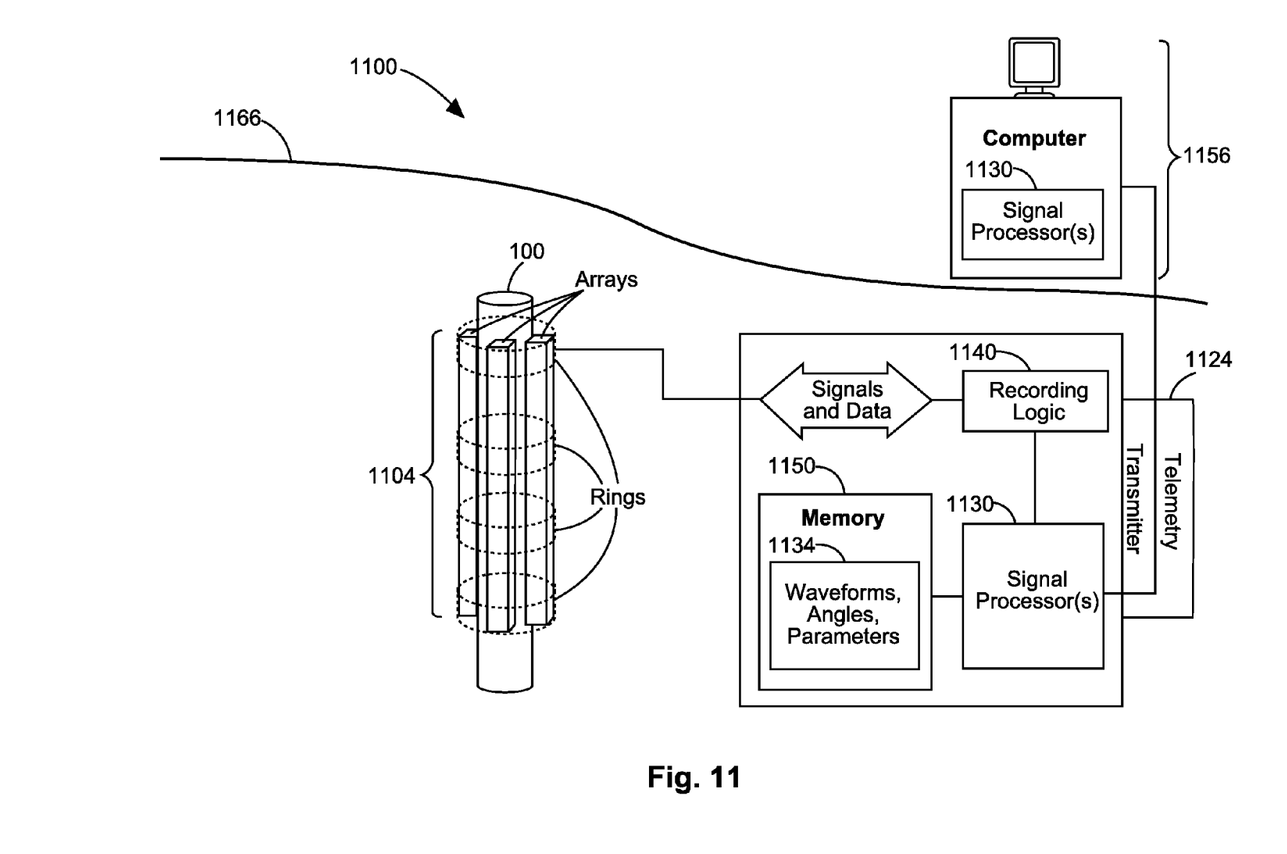
FIG. 11 is a block diagram of an apparatus according to various embodiments of the invention.

FIG. 11 is a block diagram of an apparatus 1100, according to various embodiments of the invention. The apparatus 1100 may comprise a number of components, including those described in the following paragraphs.

For example, an apparatus 1100 may comprise a set of receiver and transmitter arrays 1104, recording logic 1140, and one or more signal processors 1130. The arrays 1104 may be configured as azimuthally orthogonal dipole receiver arrays and azimuthally orthogonal transmitter arrays, attached to a down hole tool, similar to or identical to the tool 100 shown in FIG. 1. The logic 1140 may be configured to record a plurality of acoustic waveforms corresponding to acoustic waves received at the azimuthally orthogonal dipole receiver arrays, the waves being generated by the azimuthally orthogonal transmitter arrays.

The signal processor 1130 may be configured to estimate a global minimum of an objective function with respect to an azimuth angle and a set (possibly null) of auxiliary parameters, wherein the azimuth angle corresponds to an orientation of the transmitter arrays and the receiver arrays relative to fast and slow principal flexural wave axes. The signal processor 1130 may be further configured to estimate fast and slow principal flexural waves propagating along the axes and characterized by the waveforms as ordered complex eigenvalues of a waveform matrix diagonalized by a unitary similarity transformation at each data point of the waveforms, and the objective function depending on the waveforms (which may comprise cross-dipole waveforms), the ordered eigenvalues, the azimuth angle, and (optionally) the set of auxiliary parameters. The signal processor may also be configured to remove existing ambiguities associated with the fast and slow principal flexural wave axes.

The apparatus 1100 may further comprise a memory 1150 to receive and store values 1134 associated with the global minimum of the objective function, such as values corresponding to the azimuth angle and the auxiliary parameters at the global minimum. In some embodiments, the apparatus may comprise a telemetry transmitter 1124 to communicate values associated with the global minimum of the objective function, to include at least the azimuth angle, to a logging facility 1156 at the surface 1166, perhaps a facility 1156 that includes the signal processor.

In the apparatus 1100, the signal processor 1130 may be located at the surface, or be at least partially housed by the downhole tool 100. The surface facility may comprise a display (see element 496 of FIGS. 5, 6) to display various elements of the acquired waveform data, the azimuth angle, the global minimum of the objective function, formation properties, and formation anisotropy information.

Figure 5:
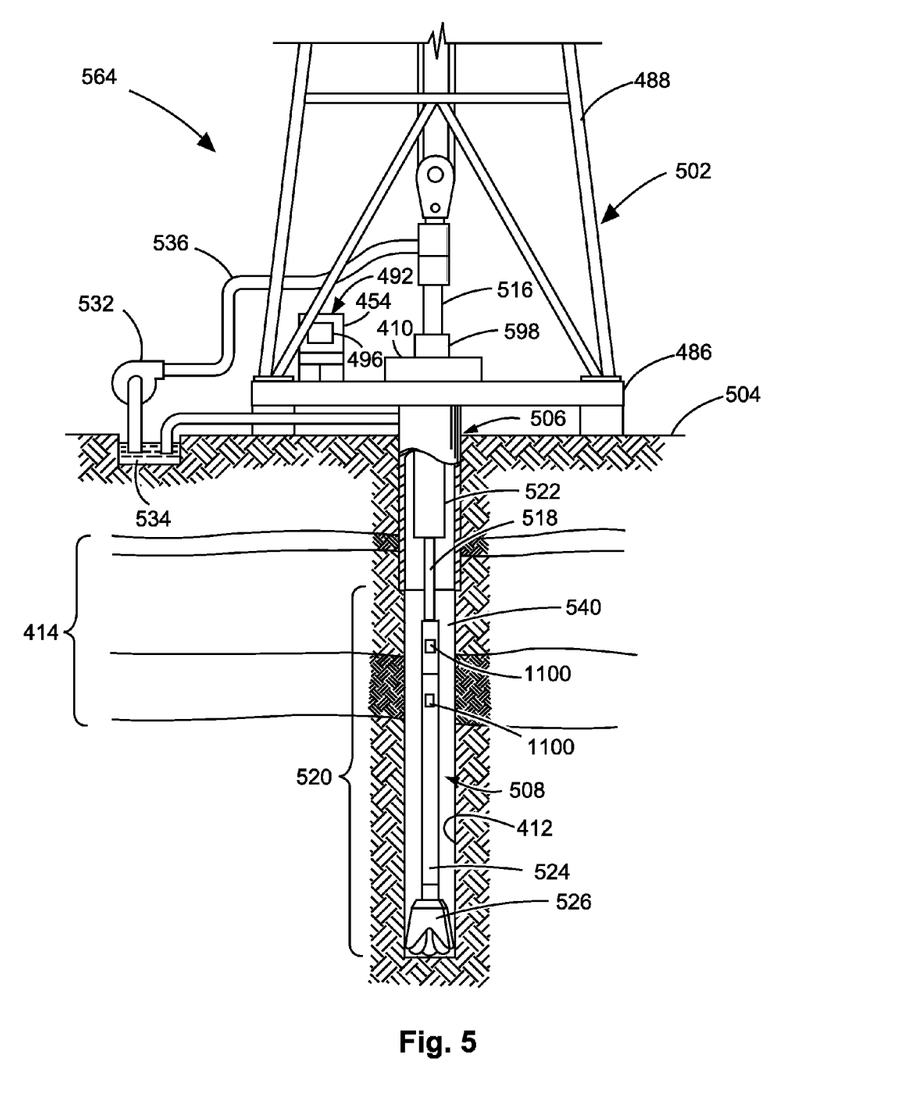
FIGS. 5-6 illustrate system embodiments of the invention.
Figure 6:
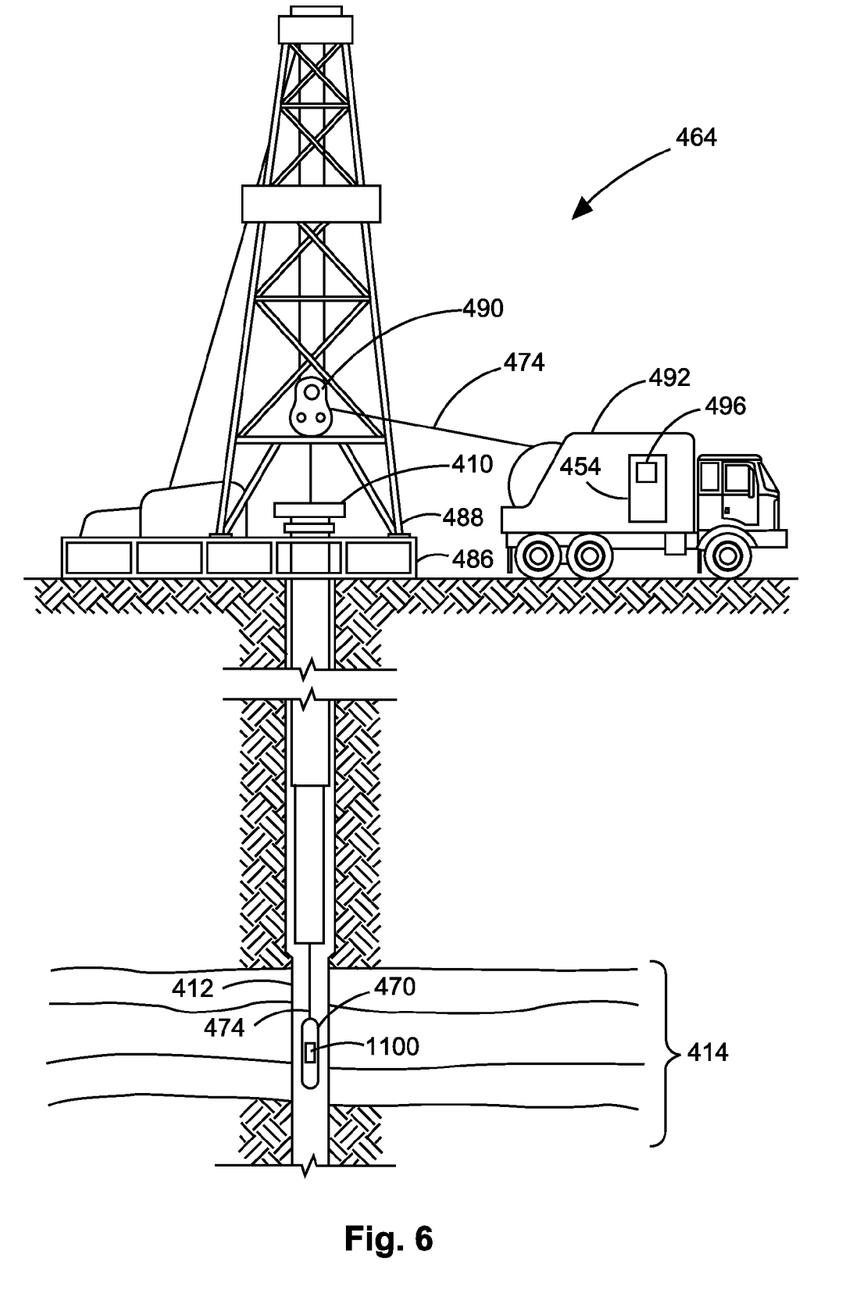

FIGS. 5-6 illustrate system embodiments of the invention. For example, FIG. 5 illustrates a drilling rig system 564 embodiment of the invention, and FIG. 6 illustrates a wireline system 464 embodiment of the invention. Thus, systems 464, 564 may comprise portions of a tool body 470 as part of a wireline logging operation, or of a downhole tool 524 as part of a downhole drilling operation.

Drilling of oil and gas wells is commonly carried out using a string of drill pipes connected together so as to form a drilling string that is lowered through a rotary table 410 into a wellbore or borehole 412. Turning now to FIG. 5, it can be seen how a system 564 may form a portion of a drilling rig 502 located at the surface 504 of a well 506. The drilling rig 502 may provide support for a drill string 508. The drill string 508 may operate to penetrate a rotary table 410 for drilling a borehole 412 through subsurface formations 414. The drill string 508 may include a Kelly 516, drill pipe 518, and a bottom hole assembly 520, perhaps located at the lower portion of the drill pipe 518. In some embodiments, apparatus 1100 may be carried as part of the drill string 508 or the downhole tool 524.

The bottom hole assembly 520 may include drill collars 522, a downhole tool 524, and a drill bit 526. The drill bit 526 may operate to create a borehole 412 by penetrating the surface 504 and subsurface formations 414. The downhole tool 524 may comprise any of a number of different types of tools including MWD (measurement while drilling) tools, LWD tools, and others.

During drilling operations, the drill string 508 (perhaps including the Kelly 516, the drill pipe 518, and the bottom hole assembly 520) may be rotated by the rotary table 410. In addition to, or alternatively, the bottom hole assembly 520 may also be rotated by a motor (e.g., a mud motor) that is located downhole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation 414 cuttings created by operating the drill bit 526.

FIG. 6 shows a well during wireline logging operations. A drilling platform 486 is equipped with a derrick 480 that supports a hoist 490. Here it is assumed that the drilling string has been temporarily removed from the borehole 412 to allow a wireline logging tool body 470, such as a probe or sonde that carries a sonic tool, to be lowered by wireline or logging cable 474 into the borehole 412. Typically, the tool body 470 is lowered to the bottom of the region of interest and subsequently pulled upward at a substantially constant speed.

During the upward trip, apparatus 1100 included in the tool body 470 may be used to perform measurements in the borehole 412 as they pass by. The measurement data can be communicated to a surface logging facility 492 for storage, processing, and analysis. The logging facility 492 may be provided with electronic equipment for various types of signal processing, which may be implemented by any one or more of the components of the apparatus 1100 shown in FIG. 11. The log data is similar to that which may be gathered and analyzed during drilling operations (e.g., during logging while drilling (LWD) operations).

The boreholes 110; 412; apparatus 300; logging facility 492; display 396; rotary table 410; formation 414; systems 464, 564; tool body 470; drilling platform 486; derrick 480; hoist 490; logging cable 474; drilling rig 502; well 506; drill string 508; Kelly 516; drill pipe 518; bottom hole assembly 520; drill collars 522; downhole tool 524; drill bit 526; mud pump 532; mud pit 534; and hose 536 may all be characterized as "modules" herein. Such modules may include hardware circuitry, and/or a processor and/or memory circuits, software program modules and objects, and/or firmware, and combinations thereof, as desired by the architect of the apparatus 1100 and systems 464, 564, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 1100 and systems 464, 564 are intended to provide a general understanding of the structure of various embodiments, and they are not intended to serve as a complete description of all the elements and features of apparatus and systems that might make use of the structures described herein.

Applications that may incorporate the novel apparatus and systems of various embodiments include a variety of electronic systems, such as televisions, cellular telephones, personal computers, workstations, radios, video players, vehicles, and location technology (e.g., GPS (Global Positioning System) location technology), signal processing for geothermal tools and smart transducer interface node telemetry systems, among others. Some embodiments include a number of methods.

Thus, a system 464, 564 may comprise a down hole tool and one or more apparatus 1100, as described previously. The downhole tool may comprise a wireline tool or a measurement while drilling tool, among others. In some embodiments, the azimuthally orthogonal dipole receiver arrays and azimuthally orthogonal transmitter arrays, as part of the apparatus, are each attached to the down hole tool. The recording logic, as part of the apparatus, may be attached to the tool, or form part of a surface computer. Similarly, the signal processor, as part of the apparatus, may also be attached to the tool, or form part of a surface computer. Thus, the signal processor can be attached to the tool and the results of estimating the global minimum of the objective function can be sent to the surface, or the signal processor can operate entirely on the surface. In this way, signal processing that is not completed down hole may be completed at the surface, perhaps using telemetry data obtained from the recording logic. Some embodiments include a number of methods.

Figure 7:
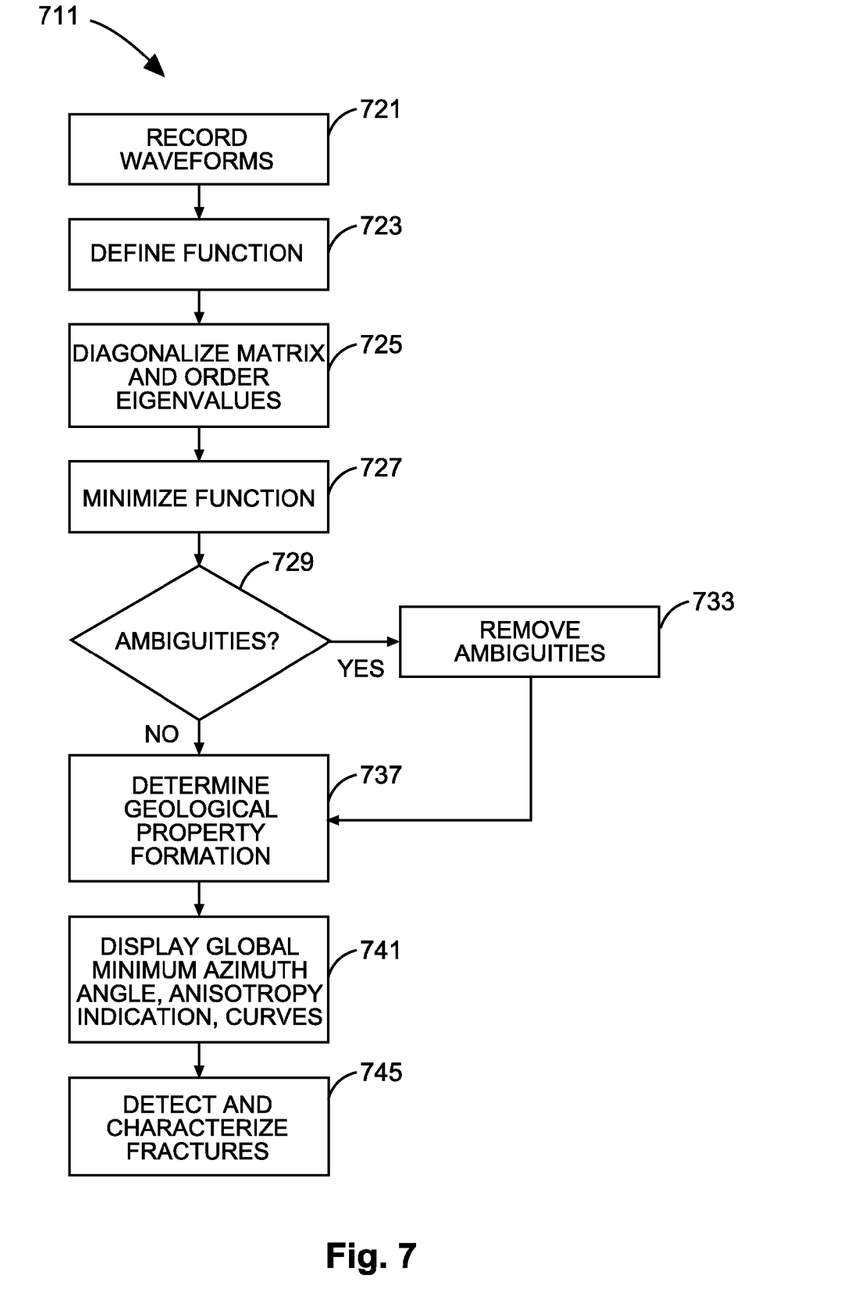
FIG. 7 is a flow chart illustrating several methods according to various embodiments of the invention.

FIG. 7 is a flow chart illustrating several methods according to various embodiments of the invention. For example, a processor-implemented method 711 to execute on one or more processors that perform methods to estimate an azimuth angle and to determine geological formation properties may comprise: recording a plurality of acoustic waveforms comprising cross-dipole waveforms and corresponding to acoustic waves received at azimuthally orthogonal dipole receiver arrays surrounded by a geological formation, the waves being generated by azimuthally orthogonal dipole transmitter arrays, wherein fast and slow principal flexural waves characterized by the waveforms are estimated as the ordered complex eigenvalues of a waveform matrix diagonalized by a unitary similarity transformation at each data point of the waveforms; defining an objective function dependent on the cross-dipole waveforms, the eigenvalues, an azimuth angle corresponding to an orientation of the transmitter and receiver arrays relative to fast and slow principal wave axes, and a set (possibly null) of auxiliary parameters; minimizing the objective function with respect to said angle and the set of auxiliary parameters; and determining at least one property of the geological formation based on the global minimum.

In some embodiments, a processor-implemented method 711 of estimating an azimuth angle, to execute on one or more processors that perform the method, comprises: at block 721, recording a plurality of acoustic waveforms corresponding to acoustic waves received at azimuthally orthogonal dipole receiver arrays surrounded by a geological formation, the waves being generated by azimuthally orthogonal transmitter arrays, the azimuth angle corresponding to an orientation of the receiver arrays and the transmitter arrays relative to fast and slow principal flexural wave axes, wherein fast and slow principal flexural waves propagating along the axes and characterized by the waveforms being estimated as the ordered (optionally complex) eigenvalues of a waveform matrix diagonalized by a unitary similarity transformation; at block 723, defining an objective function dependent on the waveforms (which may comprise cross-dipole waveforms), the ordered eigenvalues, the azimuth angle, and (optionally) a set of auxiliary parameters; at block 727, minimizing the objective function with respect to the azimuth angle (and optionally, the set of auxiliary parameters); and at block 737, determining at least one anisotropy angle of the geological formation based on the global minimum.

The matrix (perhaps comprising a cross-dipole waveform matrix) represents a set of data points in a space defined by receiver ring index position and time. The matrix may also represent a set of data points in a space defined by receiver ring index position and frequency.

The method 711 may further comprise, at block 725, diagonalizing the waveform matrix by a unitary similarity transformation at each data point of the waveforms, by computing a unitary matrix having columns comprising complex eigenvectors of the waveform matrix at each of the data points of the waveforms; and computing the eigenvalues of the eigenvectors.

Analytical or numerical methods (e.g., the Matlab® software "eig" function) may be used to diagonalize the matrix. Thus, diagonalizing the waveform matrix is accomplished using an analytical method or a numerical method.

In some embodiments, the method 711 may comprise, at block 725: ordering the eigenvalues by ordering eigenvectors and corresponding ones of the eigenvalues across data points of the waveforms such that a difference in angle between the eigenvectors across the data points is minimized, and (optionally) ordering the eigenvectors and the corresponding ones of the eigenvalues across the data points using a parameter correlated in a known way with the difference in the angle.

In some embodiments, the method 711 may comprise, at block 725: ordering eigenvectors and corresponding ones of the eigenvalues across receiver rings at each frequency in a space defined by data points in the waveforms; estimating eigenvalue propagators across the receiver rings from the ordered (across the receiver rings) eigenvalues at each frequency in the space; and ordering the eigenvectors, the corresponding ones of the eigenvalues, and the propagators over frequency by comparing relative phases associated with the estimates of the eigenvalue propagators at one frequency to relative phases associated with the estimates of the eigenvalue propagators at another frequency.

Ordering eigenvectors and eigenvalues as described above is relevant to waveforms in the frequency domain. When the waveforms are in the time domain, an embodiment comprises ordering by using the difference in angle across time and receiver ring index. Then fast and slow slowness values can be used as auxiliary parameters and determined by minimizing the objective function.

In some embodiments, the objective function is defined by utilizing all combinations of receiver rings by estimating eigenvalues at receiver ring index m from application of estimated propagators to eigenvalues at receiver ring index n. When the waveforms are in the time domain an embodiment utilizing all combinations of receiver rings comprises shifting the waveforms according to their receiver ring index by using the auxiliary parameter slowness values.

Minimizing the objective function may be accomplished analytically or by using a numerical search algorithm. Minimizing the objective function may also be accomplished by estimating eigenvalue propagators from the eigenvalues, without minimizing the objective function over a set of auxiliary parameters.

The method of not minimizing the objective function over a set of auxiliary parameters is used in an embodiment that takes advantage of a frequency domain approach, with propagator estimates. In other embodiments that operate in either the time or frequency domain, the objective function is often minimized over a set of auxiliary parameters.

In some embodiments, determining at least one anisotropy angle of the geological formation comprises: implementing the activities described previously for a data point space defined by multiple frequency bands having different starting frequencies or by multiple different time periods having different starting times.

In some embodiments, this includes adding 90° (modulo 180°) to the anisotropy angle estimated for the one of the bands or time periods if its eigenvectors and associated ones of the eigenvalues have a different ordering than other ones of the bands or time periods across the bands or time periods.

In some embodiments, ordering the eigenvectors and corresponding ones of the eigenvalues comprises: switching (exchanging) the eigenvectors, the corresponding ones of the eigenvalues, and the propagators; and adding 90° to an anisotropy angle estimated for a frequency band at a first start frequency if a relative phase of the propagators has opposite sign when compared to a relative phase of the propagators at a second start frequency.

In some embodiments, the method 711 comprises, at block 733 (if ambiguities are determined to exist at block 729), removing global ambiguities of the axes is accomplished according to a sign of aligned relative phases. The method of using the sign of relative phase to remove the ambiguity is useful when waveforms are in the frequency domain.

Some embodiments of the method 711 comprise, at block 741, displaying the global minimum in conjunction with at least one anisotropy angle.

Some embodiments of the method 711 comprise, at block 741, displaying an indication of stress induced anisotropy when an estimated version of the azimuth angle exhibits approximately a 90° jump as a function of start frequency, and dispersion curves for fast and slow principal flexural waves propagating along the axes, wherein the dispersion curves are created from the estimated version of the azimuth angle and the waveforms at each one of the start frequencies.

Some embodiments of the method 711 comprise, at block 745, detecting and characterizing formation fractures and a formation ambient stress field, based on the at least one anisotropy angle and an absolute orientation of a down hole tool carrying the transmitter arrays and the receiver arrays.

Additional activities forming a part of the methods 711 are listed in the activities for methods claimed below, and described above with respect to FIGS. 1-6 and 8-11. Thus, it should be noted that the methods described herein do not have to be executed in the order described, or in any particular order. Moreover, various activities described with respect to the methods identified herein can be executed in iterative, serial, or parallel fashion. Some activities may be added, and some of the included activities may be left out. Information, including parameters, commands, operands, and other data, can be sent and received in the form of one or more carrier waves.

Figure 8:
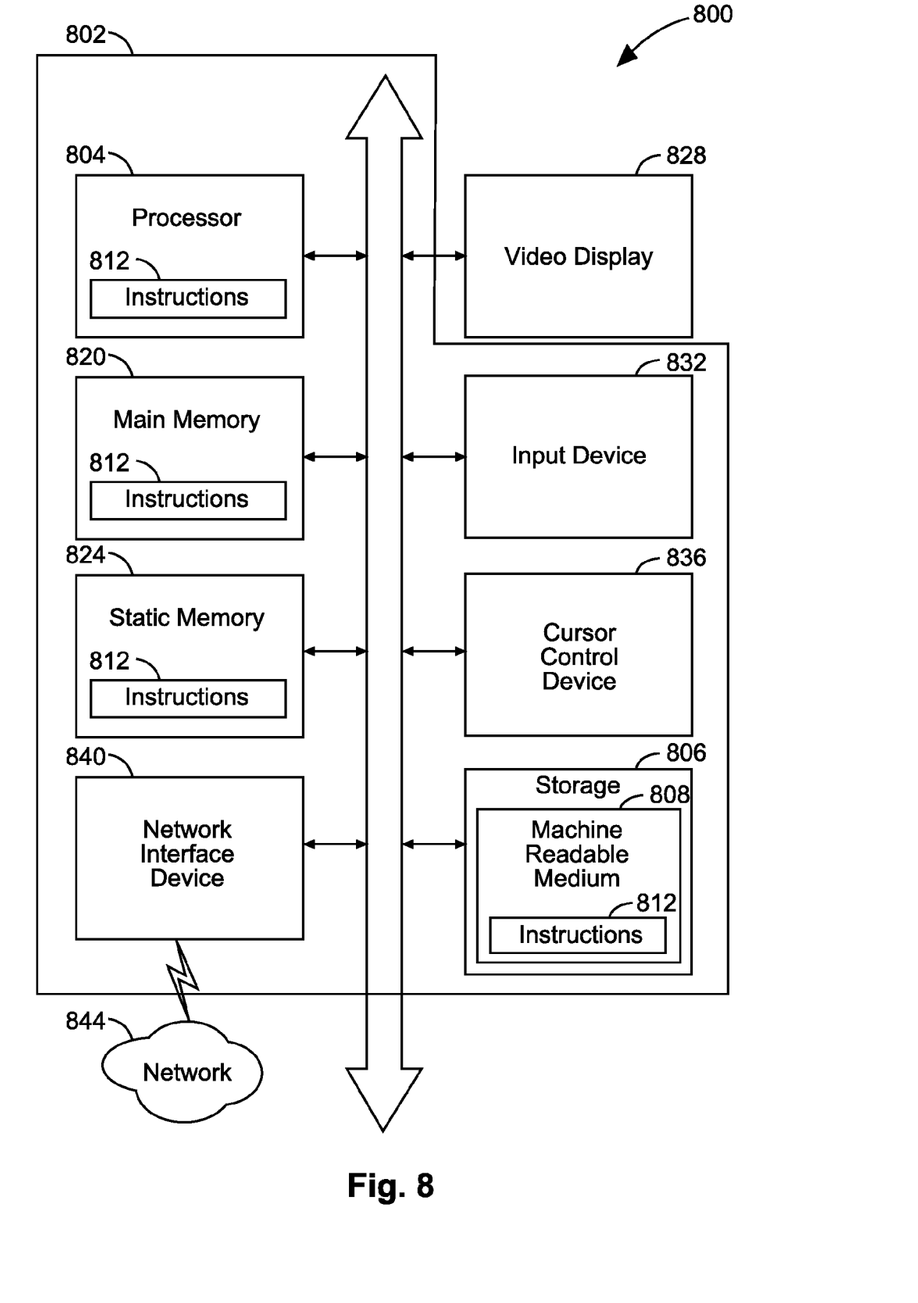
FIG. 8 is a block diagram of an article according to various embodiments of the invention.

FIG. 8 is a block diagram of an article 800 of manufacture, including a specific machine 802, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. In some embodiments, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 800 of manufacture, such as a computer, a memory system, a magnetic or optical disk, some other storage device, and/or any type of electronic device or system may include one or more processors 804 coupled to a machine-readable medium 808 such as a memory (e.g., removable storage media, as well as any memory including an electrical, optical, or electromagnetic conductor comprising non-transitory, tangible media) having instructions 812 stored thereon (e.g., computer program instructions), which when executed by the one or more processors 804 result in the machine 802 performing any of the actions described with respect to the methods above.

The machine 802 may take the form of a specific computer system having a processor 804 coupled to a number of components directly, and/or using a bus 816. Thus, the machine 802 may be similar to or identical to the workstation 454 shown in FIGS. 5 and 6, or the processor in the apparatus 1100 of FIG. 11.

Turning now to FIG. 8, it can be seen that the components of the machine 802 may include main memory 820, static or non-volatile memory 824, and mass storage 806. Other components coupled to the processor 804 may include an input device 832, such as a keyboard, or a cursor control device 836, such as a mouse. An output device 828, such as a video display, may be located apart from the machine 802 (as shown), or made as an integral part of the machine 802.

A network interface device 840 to couple the processor 804 and other components to a network 844 may also be coupled to the bus 816. The instructions 812 may be transmitted or received over the network 844 via the network interface device 840 utilizing any one of a number of well-known transfer protocols (e.g., HyperText Transfer Protocol). Any of these elements coupled to the bus 816 may be absent, present singly, or present in plural numbers, depending on the specific embodiment to be realized.

The processor 804, the memories 820, 824, and the storage device 806 may each include instructions 812 which, when executed, cause the machine 802 to perform any one or more of the methods described herein. In some embodiments, the machine 802 operates as a standalone device or may be connected (e.g., networked) to other machines. In a networked environment, the machine 802 may operate in the capacity of a server or a client machine in server-client network environment, or as a peer machine in a peer-to-peer (or distributed) network environment.

The machine 802 may comprise a personal computer (PC), a workstation, a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 802 is illustrated, the term "machine" shall also be taken to include any collection of machines that individually or jointly execute a set (or multiple sets) of instructions to perform any one or more of the methodologies discussed herein.

While the machine-readable medium 808 is shown as a single medium, the term "machine-readable medium" should be taken to include a single medium or multiple media (e.g., a centralized or distributed database, and/or associated caches and servers, and or a variety of storage media, such as the registers of the processor 804, memories 820, 824, and the storage device 806 that store the one or more sets of instructions 812. The term "machine-readable medium" shall also be taken to include any medium that is capable of storing, encoding or carrying a set of instructions for execution by the machine and that cause the machine 802 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Using the apparatus, systems, and methods disclosed herein, those in the petroleum recovery industry and other industries may now be able to more accurately and rapidly assess the properties of geologic formations, including stress induced anisotropy. Increased operational efficiency and client satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description and the figures, with each claim standing on its own as a separate embodiment.

What is claimed is:

1. An apparatus, comprising:
   azimuthally orthogonal dipole receiver arrays and azimuthally orthogonal transmitter arrays;
   logic to record a plurality of acoustic waveforms corresponding to acoustic waves received at the azimuthally orthogonal dipole receiver arrays, the acoustic waves being generated by the azimuthally orthogonal transmitter arrays; and
   a signal processor to estimate a global minimum of an objective function with respect to an azimuth angle and a set of auxiliary parameters, wherein the azimuth angle corresponds to an orientation of the transmitter arrays and the receiver arrays relative to fast and slow principal flexural wave axes, with the signal processor configured to estimate fast and slow principal flexural waves propagating along the axes and characterized by the waveforms as ordered complex eigenvalues of a waveform matrix diagonalized by a similarity transformation at each data point of the waveforms, and the objective function depending on the waveforms, the ordered eigenvalues, the azimuth angle, and the set of auxiliary parameters, wherein the signal processor is also configured to remove existing ambiguities associated with the fast and slow principal flexural wave axes.

2. The apparatus of claim 1, further comprising:
   a memory to receive and store values associated with the global minimum of the objective function, to include at least the azimuth angle.

3. The apparatus of claim 1, further comprising:
   a telemetry transmitter to communicate values associated with the global minimum of the objective function to a surface logging facility.

4. The apparatus of claim 1, wherein the similarity transformation is a unitary similarity transformation.

5. A system, comprising:
   a down hole tool;
   azimuthally orthogonal dipole receiver arrays and azimuthally orthogonal transmitter arrays, each of the arrays attached to the down hole tool;
   logic to record a plurality of acoustic waveforms corresponding to acoustic waves received at the azimuthally orthogonal dipole receiver arrays, the acoustic waves being generated by the azimuthally orthogonal transmitter arrays; and
   a signal processor to estimate a global minimum of an objective function with respect to an azimuth angle and a set of auxiliary parameters, wherein the azimuth angle corresponds to an orientation of the transmitter arrays and the receiver arrays relative to fast and slow principal flexural wave axes, with the signal processor configured to estimate fast and slow principal flexural waves propagating along the axes and characterized by the waveforms as ordered complex eigenvalues of a waveform matrix diagonalized by a similarity transformation at each data point of the waveforms, and the objective function depending on the waveforms, the ordered eigenvalues, the azimuth angle, and the set of auxiliary parameters, wherein the signal processor is also configured to remove existing ambiguities associated with the fast and slow principal flexural wave axes.

6. The system of claim 5, wherein the downhole tool comprises one of a wireline tool or a measurement while drilling tool.

7. The system of claim 5, further comprising:
a surface computer comprising the signal processor.

8. The system of claim 5, wherein the similarity transformation is a unitary similarity transformation.

9. A processor-implemented method of estimating an azimuth angle, to execute on one or more processors that perform the method, comprising:
recording a plurality of acoustic waveforms corresponding to acoustic waves received at azimuthally orthogonal dipole receiver arrays surrounded by a geological formation, the waves being generated by azimuthally orthogonal transmitter arrays, the azimuth angle corresponding to an orientation of the receiver arrays and the transmitter arrays relative to fast and slow principal flexural wave axes, wherein fast and slow principal flexural waves propagating along the axes and characterized by the waveforms being estimated as the ordered eigenvalues of a waveform matrix diagonalized by a similarity transformation;
defining an objective function dependent on the waveforms, the ordered eigenvalues, the azimuth angle, and a set of auxiliary parameters;
minimizing the objective function with respect to the azimuth angle; and
determining at least one anisotropy angle of the geological formation based on the global minimum.

10. The method of claim 9, wherein the matrix represents a set of data points in a space defined by receiver ring index position and time.

11. The method of claim 10, wherein determining at least one anisotropy angle of the geological formation comprises:
implementing the defining, the minimizing, and the determining for a data point space defined over multiple frequency bands having different starting frequencies or by multiple different time periods having different starting times.

12. The method of claim 11, further comprising:
adding 90° to the anisotropy angle estimated for the one of the bands or time periods if its eigenvectors and associated ones of the eigenvalues have a different ordering than other ones of the bands or time periods across the bands or time periods.

13. The method of claim 9, wherein the matrix represents a set of data points in a space defined by receiver ring index position and frequency.

14. The method of claim 9, further comprising:
diagonalizing the waveform matrix by a similarity transformation at each data point of the waveforms, by computing a matrix having columns comprising complex eigenvectors of the waveform matrix at each of the data points of the waveforms; and computing the eigenvalues of the eigenvectors.

15. The method of claim 14, wherein diagonalizing the waveform matrix is accomplished using an analytical method or a numerical method.

16. The method of claim 14, wherein the similarity transformation is a unitary similarity transformation.

17. The method of claim 9, further comprising:
ordering the eigenvalues by ordering eigenvectors and corresponding ones of the eigenvalues across data points of the waveforms such that a difference in angle between the eigenvectors across the data points is minimized, and ordering the eigenvectors and the corresponding ones of the eigenvalues across the data points using a parameter correlated in a known way with the difference in the angle.

18. The method of claim 9, further comprising:
ordering eigenvectors and corresponding ones of the eigenvalues across receiver rings at each frequency in a space defined by data points in the waveforms;
estimating eigenvalue propagators across the receiver rings from the ordered eigenvalues at each frequency in the space; and
ordering the eigenvectors, the corresponding ones of the eigenvalues, and the propagators over frequency by comparing relative phases associated with the estimates of the eigenvalue propagators at one frequency to relative phases associated with the estimates of the eigenvalue propagators at another frequency.

19. The method of claim 18, wherein ordering the eigenvectors and corresponding ones of the eigenvalues comprises:
switching the eigenvectors, the corresponding ones of the eigenvalues, and the propagators; and
adding 90° to an anisotropy angle estimated for a frequency band at a first start frequency if a relative phase of the propagators has opposite sign when compared to a relative phase of the propagators at a second start frequency.

20. The method of claim 9, wherein the objective function is defined by utilizing all combinations of receiver rings by estimating eigenvalues at receiver ring index m from application of estimated propagators to eigenvalues at receiver ring index n.

21. The method of claim 9, wherein minimizing the objective function is accomplished analytically or by using a numerical search algorithm.

22. The method of claim 9, minimizing the objective function by estimating eigenvalue propagators from the eigenvalues, without minimizing the objective function over a set of auxiliary parameters.

23. The method of claim 9, further comprising:
removing global ambiguities of the axes is accomplished according to a sign of aligned relative phases.

24. The method of claim 9, wherein the similarity transformation is a unitary similarity transformation.

25. An article including a machine-accessible medium having instructions stored therein, wherein the instructions, when accessed, result in a machine estimating an azimuth angle by performing:
recording a plurality of acoustic waveforms corresponding to acoustic waves received at azimuthally orthogonal dipole receiver arrays surrounded by a geological formation, the waves being generated by azimuthally orthogonal transmitter arrays, the azimuth angle corresponding to an orientation of the receiver arrays and the transmitter arrays relative to fast and slow principal flexural wave axes, wherein fast and slow principal flexural waves propagating along the axes and characterized by the waveforms being estimated as the ordered eigenvalues of a waveform matrix diagonalized by a similarity transformation;

defining an objective function dependent on the waveforms, the ordered eigenvalues, the azimuth angle, and a set of auxiliary parameters;

minimizing the objective function with respect to the azimuth angle; and determining at least one anisotropy angle of the geological formation based on the global minimum.

26. The article of claim 25, further comprising:
displaying the global minimum in conjunction with the at least one anisotropy angle.

27. The article of claim 25, further comprising:
displaying an indication of stress induced anisotropy when an estimated version of the azimuth angle exhibits approximately a 90° jump as a function of start frequency, and dispersion curves for fast and slow principal flexural waves propagating along the axes, wherein the dispersion curves are created from the estimated version of the azimuth angle and the waveforms at each one of the start frequencies.

28. The article of claim 25, wherein the instructions, when accessed, result in the machine performing:
detecting and characterizing formation fractures and a formation ambient stress field, based on the at least one anisotropy angle and an absolute orientation of a downhole tool carrying the transmitter arrays and the receiver arrays.

29. The article of claim 25, wherein the similarity transformation is a unitary similarity transformation.

* * * * *